(12) United States Patent
Hahn

(10) Patent No.: US 11,001,208 B2
(45) Date of Patent: May 11, 2021

(54) CLADDING ARRANGEMENT FOR CLADDING A BODY ELEMENT OF A VEHICLE

(71) Applicant: Daimler AG, Stuttgart (DE)

(72) Inventor: Samuel Hahn, Boeblingen (DE)

(73) Assignee: Daimler AG, Stuttgart (DE)

( * ) Notice: Subject to any disclaimer, the term of this patent is extended or adjusted under 35 U.S.C. 154(b) by 52 days.

(21) Appl. No.: 16/478,655

(22) PCT Filed: Jan. 16, 2018

(86) PCT No.: PCT/EP2018/050920
§ 371 (c)(1),
(2) Date: Jul. 17, 2019

(87) PCT Pub. No.: WO2018/134164
PCT Pub. Date: Jul. 26, 2018

(65) Prior Publication Data
US 2019/0366947 A1  Dec. 5, 2019

(30) Foreign Application Priority Data

Jan. 18, 2017 (DE) .................... 10 2017 000 394.7

(51) Int. Cl.
*B60R 13/04* (2006.01)
(52) U.S. Cl.
CPC .................................. *B60R 13/04* (2013.01)
(58) Field of Classification Search
CPC ...... B60R 13/04; B60R 13/043; B62D 25/025
(Continued)

(56) References Cited

U.S. PATENT DOCUMENTS 5,678,872 A * 10/1997 Slater ...................... B60R 3/02
292/35
6,158,756 A * 12/2000 Hansen .................... B60R 3/02
280/166
(Continued)

FOREIGN PATENT DOCUMENTS

DE         36 13 301 A1    10/1987
DE    10 2004 045 382 A1    3/2006
(Continued)

OTHER PUBLICATIONS

PCT/EP2018/050920, International Search Report dated Mar. 5, 2018 (Two (2) pages).
(Continued)

*Primary Examiner* — Gregory A Blankenship
(74) *Attorney, Agent, or Firm* — Crowell & Moring LLP

(57) ABSTRACT

A trim assembly for a trim of a body element of a vehicle includes a pivotably mounted first trim element that is displaceable into a first functional position and into a second functional position and an adjustment device for adjusting the first trim element from the first functional position into the second functional position and/or from the second functional position into the first functional position. The adjustment device is configured to secure the first trim element in a blocking position in at least one of the first functional position and the second functional position, against displacement out of the blocking position. A stop element is disposed such that, in the blocking position, the adjustment device rests via the stop element on a stop or rests on the stop element.

10 Claims, 3 Drawing Sheets

(58) Field of Classification Search
USPC .................................................. 296/1.08, 209
See application file for complete search history.

(56) References Cited

U.S. PATENT DOCUMENTS

| | | | | |
|---|---|---|---|---|
| 6,742,835 | B1* | 6/2004 | Floarea | B60R 13/04 |
| | | | | 296/203.03 |
| 8,136,826 | B2* | 3/2012 | Watson | B60R 3/002 |
| | | | | 280/166 |
| 8,303,021 | B2 | 11/2012 | Lichter et al. | |
| 8,602,467 | B2* | 12/2013 | Lee | B60R 5/041 |
| | | | | 293/106 |
| 9,481,396 | B2* | 11/2016 | Jachowski | B62D 35/008 |
| 9,701,249 | B2* | 7/2017 | Leitner | B60R 3/02 |
| 9,944,231 | B2* | 4/2018 | Leitner | B60R 3/02 |
| 10,150,419 | B2* | 12/2018 | Derbis | B60R 3/02 |
| 10,654,418 | B2* | 5/2020 | He | B60R 3/02 |
| 10,814,790 | B2* | 10/2020 | Meszaros | B60R 3/02 |
| 2004/0100063 | A1* | 5/2004 | Henderson | B60R 3/002 |
| | | | | 280/166 |
| 2005/0179227 | A1* | 8/2005 | Leitner | B60R 3/002 |
| | | | | 280/163 |
| 2005/0258616 | A1* | 11/2005 | Scheuring | B60R 3/002 |
| | | | | 280/166 |
| 2008/0054586 | A1* | 3/2008 | Lechkun | B60R 3/02 |
| | | | | 280/166 |
| 2008/0179920 | A1* | 7/2008 | Watson | B60R 3/002 |
| | | | | 296/209 |
| 2014/0180546 | A1* | 6/2014 | Cha | B60R 3/02 |
| | | | | 701/49 |
| 2016/0137134 | A1* | 5/2016 | Nania | B60R 3/02 |
| | | | | 280/164.1 |
| 2019/0366947 | A1* | 12/2019 | Hahn | B60R 13/04 |
| 2021/0016724 | A1* | 1/2021 | Hahn | B60R 13/04 |
| 2021/0024014 | A1* | 1/2021 | Hahn | B62D 25/025 |

FOREIGN PATENT DOCUMENTS

| | | |
|---|---|---|
| DE | 10 2007 057 936 A1 | 7/2009 |
| DE | 10 2009 031 534 A1 | 2/2010 |
| DE | 10 2011 112 245 A1 | 3/2013 |
| DE | 10 2012 018 284 A1 | 3/2013 |
| FR | 2 729 114 A1 | 7/1996 |

OTHER PUBLICATIONS

German Office Action issued in German counterpart application No. 10 2017 000 394.7 dated Sep. 11, 2017 (Six (6) pages).

* cited by examiner

CLADDING ARRANGEMENT FOR CLADDING A BODY ELEMENT OF A VEHICLE

BACKGROUND AND SUMMARY OF THE INVENTION

The invention relates to a trim assembly for a trim for a body element of a vehicle.

DE 10 2009 031 534 A1 discloses a generic trim assembly comprising a trim element, one trim element being pivotably mounted on at least one further trim element. A trim assembly of this kind is used in particular for making ever-increasing requirements for the ergonomics and comfort of vehicles, in particular in view of the ease of getting in and out of the vehicles, consistent with corrosion protection requirements for the body, in particular on doors thereof. In this case, it has been found in particular that door bottom edges of vehicle bodies are protected from rock chips and dirt by a side member trim, the side member trim protruding beyond the door bottom edge, in the vehicle width direction, or ending flush with the door. However, this side member trim is in the way of the legs of a user of the vehicle when getting in and out of the vehicle, which may be problematic in particular for older people or for people having restricted mobility. This problem is aggravated when the vehicle door cannot be opened very wide, in the case of a vehicle that is parked in a garage. It is therefore possible for the trim element of the trim assembly to be moved from an extended protection position, in which it protects the vehicle door or another body element from rock chips, other damage, dirt, and in particular corrosion in that it ends flus with or overlaps the element, into a folded-in comfort position, in which space is freed for the legs of a user of the vehicle when getting into or out of the vehicle.

In this case, a disadvantage of the known trim assembly is that no retention means is provided for the pivotable trim element in the different functional positions thereof, with the result that the trim element cannot enter the positions in a defined manner or be securely retained in these positions. For example, forces acting on the trim element may pivot the element out of the extended protection position thereof and into the folded-in comfort position, without this actually being desired.

The object of the invention is that of providing a trim assembly which does not have the mentioned disadvantages.

The trim assembly used for the trim of a body element, in particular a side rocker, of a vehicle comprises a pivotably mounted first trim element that can be displaced into a first functional position and into a second functional position. The first trim element is preferably dimensionally stable. In connection with this invention, the term "dimensionally stable" is understood to mean that the trim element has an inherent stiffness owing to the material and/or the structure, which inherent stiffness is sufficiently great that the element retains the original shape thereof, in particular when being pivoted, provided at least that no external forces, except, of course, for the forces required for displacing the trim element, act on the first trim element. The dimensionally stable trim element thus behaves entirely differently from a trim element produced from a flexible material web, as is known from the prior art. Owing to the pivotable mounting of the trim element and the dimensionally stable properties thereof, it is clear that the trim element is designed or functions in a manner similar or analogous to a flap or flap element.

The trim assembly according to the invention furthermore comprises an adjustment device which is designed to adjust the first trim element from the first functional position into the second functional position and/or from the second functional position into the first functional position. In particular, the adjustment device is preferably designed to adjust the first trim element from the first functional position into the second functional position and back. In this case, the adjustment device is designed to lock, i.e., to secure/fix, the first trim element, in at least one functional position which is selected from the first functional position and the second functional position, and which is also referred to as the blocking position, against displacement out of the blocking position. This makes it possible for the at least one blocking position to be approached in a defined manner and to be retained, it being possible to prevent accidental pivoting of the first trim element out of the blocking position and in particular in the direction of the other functional position of the two functional positions. This increases the functional reliability of the trim assembly and thus at the same time increases the comfort for a user, and/or corrosion protection for a body comprising the trim assembly, it being possible for at least one body part, for example a door, to be reliably protected by the first trim element, in particular during travel of the vehicle, from rock chips, dirt and thus ultimately also corrosion. Undesired pivoting of the first trim element by means of forces arising during travel, for example owing to airflow, can be reliably prevented. The trim assembly furthermore comprises at least one stop element which is arranged such that, in the at least one blocking position, the adjustment device rests by means of the at least one stop element on a stop or on the at least one stop element. This makes it possible to very reliably exclude the possibility of forces acting on the trim element, caused for example by people treading on the trim element when getting into or out of the vehicle, pivoting the element out of the extended protection position thereof and into the folded-in comfort position, without this actually being desired. Specifying a defined end position of the trim element by means of a stop or a stop assembly advantageously ensures a reproducible gap and joint dimension between the trim element and adjacent components.

The first functional position is preferably a protection position in which the first trim element is arranged in an extended position, such that the element can protrude, in the vehicle transverse direction, beyond a body part, for example a door, or can end flush with the body part. As a result, in the extended protection position the trim element that is arranged below the door in the vehicle height direction can reliably protect the door from rock chips, dirt, and ultimately corrosion. The second functional position is preferably a folded-in comfort position in which the first trim element is pivoted inwards so as to free up space for legs of a user of the vehicle when getting into and out of the vehicle. It is possible that the first trim element can be actively pivoted, by a user of the vehicle, from the first functional position thereof into the second functional position thereof, and preferably back again, for example by means of direct mechanical action on the first trim element, by actuating a button or switch, by selecting a menu item in an electronic operating menu, or in another suitable manner. It is also possible, however, for the first trim element to be able to be automatically displaced from the first functional position thereof into the second functional position thereof, and preferably back again, for example when a desire of a user to get into and/or out of the vehicle is identified. This may be identified for example, in the case of getting into the vehicle, upon gripping behind a door handle, upon opening the door, upon approaching the door, or in another suitable manner. In the case of getting out of the vehicle this may be identified for example upon disconnection of a drive unit of the vehicle, upon gripping behind an inside door handle, upon opening the door, or in another suitable manner. It is possible in particular for the adjustment device to be actuated, in order to displace the first trim element, when a steering wheel is also actuated for displacement into a position for getting out of the vehicle, for example for displacement upwards in the vehicle height direction.

The fact that the first trim element is locked in the blocking position by the adjustment device means in particular that the element is secured against displacement out of the blocking position and in particular into the other of the at least two functional positions in each case. In particular, it is possible for the first trim element to be bolted in the blocking position by the adjustment device. In any case, in the blocking position the first trim element cannot be released unintentionally, i.e., in particular without active actuation of the adjustment device or displacement by the adjustment device, owing to the locking by the adjustment device. The first trim element is preferably displaceable out of the blocking position and into the other functional position in each case only by overcoming a force counteracting the displacement.

Preferably, in the blocking position, the adjustment device applies a force to the first trim element which pushes the first trim element into the blocking position.

It is particularly preferable for the adjustment device to be designed to lock, i.e., fix in position, the first trim element, in both functional positions, i.e., the first functional position and the second functional position. Accordingly, in this case both functional positions are blocking positions.

The adjustment device preferably comprises an actuator or motor which is operatively connected to the first trim element for the purpose of pivoting the element. The actuator or motor is preferably assigned a transmission, via which the actuator or motor is operatively connected to the first trim element. The transmission is preferably a self-locking transmission. The self-locking property of the transmission results, in addition or as an alternative to the operating principle of the adjustment device that will be described in the following, in locking of the first trim element in the blocking position, since the self-locking effectively and efficiently counteracts displacement of the element.

According to a development of the invention, the adjustment device is arranged in an over dead center position in the at least one blocking position. Alternatively, or in addition, it is possible for the first trim element, in combination with the adjustment device, to be arranged in an over dead center position in the at least one blocking position. An over dead center position for the adjustment device, and/or for the first trim element in combination therewith, is thus a simple and easily achievable, as well as effective, way of locking the first trim element in the blocking position. Since pivoting out of the blocking position and into the other functional position, in each case, requires a dead center arranged between the functional positions to be overcome, the adjustment device has to actively act against a force counteracting the displacement into the over dead center position in order to pivot the first trim element out of the blocking position. Vice versa, the over dead center position ensures that a force that is not introduced by the adjustment device, but rather acts on the first trim element from the outside, and that tries to force the trim element counter to the blocking position and into the other functional position in each case, cannot lead to corresponding pivoting, since this force—as is always the case in an over dead center position—acts in a direction oriented away from the dead center and specifically not in the direction of the dead center, a force of this kind preferably being supported, in the over dead center position, by a stop.

According to a development of the invention, in the at least one blocking position the adjustment device rests on a stop, via the at least one stop element, or rests on the at least one stop element itself, the adjustment device being forced against the stop or the stop element by means of a force acting on the first trim element in the direction counter to the blocking position. A force of this kind, which acts on the first trim element and attempts to force the element out of the blocking position and into the other functional position in each case, is then supported by the stop element and optionally the stop, the adjustment device being unable to be forced in the displacement direction specified by the corresponding force, since the device rests on the stop element and/or rests via the stop element on the stop. The stop element is preferably provided in combination with an over dead center position in the blocking position, in particular displacement of the adjustment device away from the stop being required in order to overcome the dead center.

The adjustment device preferably itself comprises the at least one stop element. It is particularly preferable for the two functional positions of the first trim element to be designed as blocking positions, one stop element preferably being provided that provides a blocking stop for both functional positions. It is possible for the stop element to itself strike a further stop in one of the two functional positions, preferably a first part of the adjustment device cooperating in a blocking manner with the stop element in the other of the two functional positions, in particular striking the stop element, the stop element being arranged on another, second part of the adjustment device.

The adjustment device particularly preferably comprises an eccentric that is driven by the actuator or motor, preferably by means of the self-locking transmission, on which eccentric a first end of a steering lever is pivotably hinged in an off-center position, i.e., eccentrically, a second end of the steering lever, which end is opposite in the longitudinal direction of the steering lever, being pivotably hinged to the first trim element. In this case, the second end of the steering lever preferably engages on an underside projection of the first trim element. An articulation point of the steering lever on the first trim element is preferably offset relative to a pivot axis about which the first trim element is pivotable. In this way, the first trim element can be pivoted by the steering lever when the eccentric is rotated by the actuator or motor.

The over dead center position in the at least one blocking position preferably results from the articulation point of the steering lever on the first trim element, an articulation point of the steering lever on the eccentric, and a center point of the eccentric which extends through the axis of rotation of the eccentric, being arranged so as to not be colinear relative to one another in the blocking position, instead the articulation point of the steering lever on the eccentric, viewed from the other functional position, being displaced further beyond the colinear dead center position, in the blocking position, such that the articulation point has to be displaced through the dead center position in order to achieve displacement into the other functional position. However, this can be achieved only by active pivoting of the eccentric by the actuator or motor, counter to a force counteracting the displacement into the dead center position, while forces acting on the first trim element, from the outside, are introduced into the eccentric by the steering lever such that the eccentric is forced in the direction of rotation oriented counter to the other functional position, the forces preferably being supported by the stop element which prevents further rotation of the eccentric beyond the blocking position.

The stop element is preferably arranged on the eccentric, in particular fastened thereto or formed integrally therewith, the stop element preferably striking the first trim element in one of the two functional positions, the trim element being forced even further into the corresponding functional position thereby. In the other of the two functional positions, the stop element preferably cooperates with the steering lever, such that the steering lever strikes the stop element, as a result of which further rotation of the eccentric is also prevented.

According to a development of the invention, the first trim element is mounted so as to be pivotable about a pivot axis that is arranged on an upper end of the first trim element and extends in the longitudinal direction of the trim assembly.

In this case, the terms "upper" and "lower" always relate to directions which refer to an intended installation position of the trim assembly on a vehicle body. In this case, "upper" means in particular "viewed in the direction of the vehicle roof", "lower" meaning in particular "viewed in the direction of a footprint on which the vehicle is positioned". The longitudinal direction of the trim assembly is preferably simultaneously a longitudinal direction of the body or of the vehicle. The pivotable displaceability of the first trim element can be achieved for example by means of a pivot pin, but a film hinge or other suitable manners of pivotable mounting of the first trim element are also conceivable.

According to a development of the invention, the trim assembly comprises a second trim element which is stationary relative to the first trim assembly, and preferably relative to a vehicle body on which the trim assembly is arranged, the first trim element being pivotably mounted on the second trim element. The first trim element is particularly preferably arranged adjacently to the second trim element, viewed in the longitudinal direction of the trim assembly; in particular the first trim element and the second trim element are adjacent to one another, viewed in the longitudinal direction of the trim assembly. It is preferable for the first trim element, in the first functional position thereof, i.e., in the extended protection position, to end flush with the second trim element. It is particularly preferable for the first trim element and the second trim element to be designed identically, in particular having the same cross-sectional contour. As a result, the first trim element and the second trim element can align so as to be flush with one another in the first functional position, which is advantageous for visual reasons and for design reasons, a particularly efficient protection effect of the trim assembly also resulting in the first functional position.

According to a development of the invention, the first trim element extends along the longitudinal extension of the trim assembly only in regions. The trim assembly, in particular by way of the first trim element, comprises a movable part, and at least by way of the second trim element, or optionally by way of further trim elements, a stationary part, the movable part of the trim assembly extending over only part of the longitudinal extension of the overall trim assembly, and in particular over only part of a body element to which the trim is to be applied. In this case, the spatial-geometric design of the first trim element can in particular be matched to a region in which installation space for increased comfort of a user of the vehicle is requited in the comfort position. In particular, the first trim element may be provided only in the region of a vehicle and/or only in a region in which more installation space is required for legs of a user when getting into and out of the vehicle. The trim assembly can thus be designed in a simple and cost-effective manner because increased complexity, in the form if the movable first trim element, is provided only where it is actually needed.

According to a development of the invention, the trim assembly comprises at least one third trim element which is stationary relative to the first trim assembly, and preferably relative to a vehicle body. A first stop is arranged on the at least one third trim element, which stop the first trim element strikes in the first functional position thereof. In addition, or alternatively, a second stop is arranged on the third trim element, which stop the first trim element strikes in the second functional position thereof. Defined stops for the first trim element in at least one functional position, preferably in both functional positions, can thus be provided on the third trim element, which stops additionally contribute to supporting the first trim element in the functional positions, and to defining the functional positions. The second trim element and the third trim element may be formed integrally and/or of the same material.

According to a development of the invention, the adjustment device is arranged in a region of the trim assembly which, when the trim assembly is mounted as intended on a body element to which the trim is to be applied, does not overlap the body element to which the trim is to be applied. If, for example, the body element to which the trim is to be applied is a side member, the adjustment device is preferably arranged in the region of a column of the body, for example in the region of the A-column or of the B-column, which are also referred to as the central columns. This is advantageous because it is precisely in regions of this kind that there is sufficient installation space available for accommodating the adjustment device.

According to a development of the invention, the first trim element has a C-shaped cross-sectional contour. The second trim element preferably also has a C-shaped cross-sectional contour. As already mentioned, the first and the second trim element preferably have the same cross-sectional contour. In this case, an open side of the C faces an interior of the trim assembly. The closed side of the C thus faces an outer face of the trim assembly, such that it can provide effective protection, in particular from rock chips and dirt.

The at least one third trim element is preferably L-shaped, in particular in the shape of a lying L, a first, preferably longer, limb of the L forming a lower face of the trim assembly, and a second, preferably shorter, limb of the L closing the trim assembly in the direction of a vehicle interior, in particular in the direction of a vehicle central longitudinal axis. The first stop for the first trim element, which stop the element strikes in the first functional position, is preferably arranged on the first limb of the L. The second stop for the first trim element, which stop the element strikes in the second functional position, is preferably arranged on the second limb of the L.

The pivot axis, about which the first trim element is pivotable, is preferably arranged in the region of an upper curve of the C-shaped cross-sectional contour of the first trim element.

Finally, according to a development of the invention, the trim assembly is designed as a side member trim for a motor vehicle, in particular for a passenger car. In this embodiment, the above-described advantages of the trim assembly are realized particularly. In particular, a vehicle door can be protected from rock chips, dirt, and thus ultimately also corrosion, in the first, extended functional position of the first trim element, which position is the protection position, it being possible, in the second, folded-in functional position, which is a comfort position, for additional space to be freed up for legs of a user of the vehicle, in order to increase the comfort when getting into and out of the vehicle. This pivotably mounted first trim part thus extends at least over a partial length region of the side member/side rocker in the region of the body-side door opening.

The invention also relates to a motor vehicle.

The invention will be explained in greater detail in the following, with reference to the drawings.

DETAILED DESCRIPTION OF THE DRAWINGS

Figure 1:
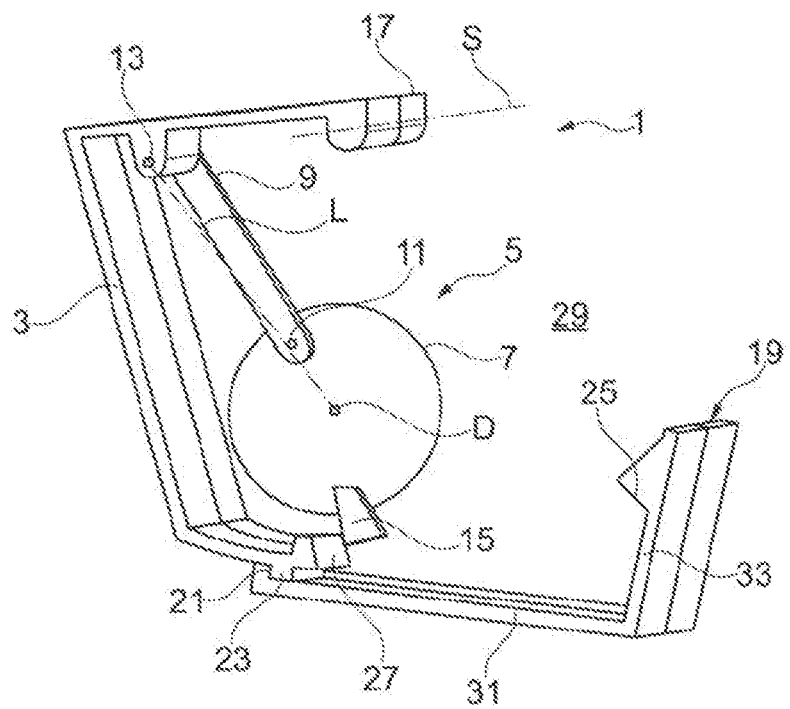
FIG. 1 is a schematic, partially perspective view of an embodiment of a trim assembly comprising a first pivotable trim element in a first functional position.

FIG. 1 shows an embodiment of a trim assembly 1 that is designed to provide a trim of a body element of a vehicle, the trim assembly 1 in particular being designed as a side member trim/rocker trim for a motor vehicle, preferably for a passenger car.

The body element is thus for example a side rocker (not shown in the drawings, but known), which is part of the body support structure/the body shell and is arranged in the region of a side door opening of the body. The side rocker that forms part of the support structure of the vehicle defines the door opening at the bottom thereof. The part of the side rocker that forms the support structure is generally a profile part that comprises at least one cavity and is assembled from shell elements or formed as an extruded profile. This support structure of the side rocker is covered, on the outside, by the trim assembly 1.

Figure 4:
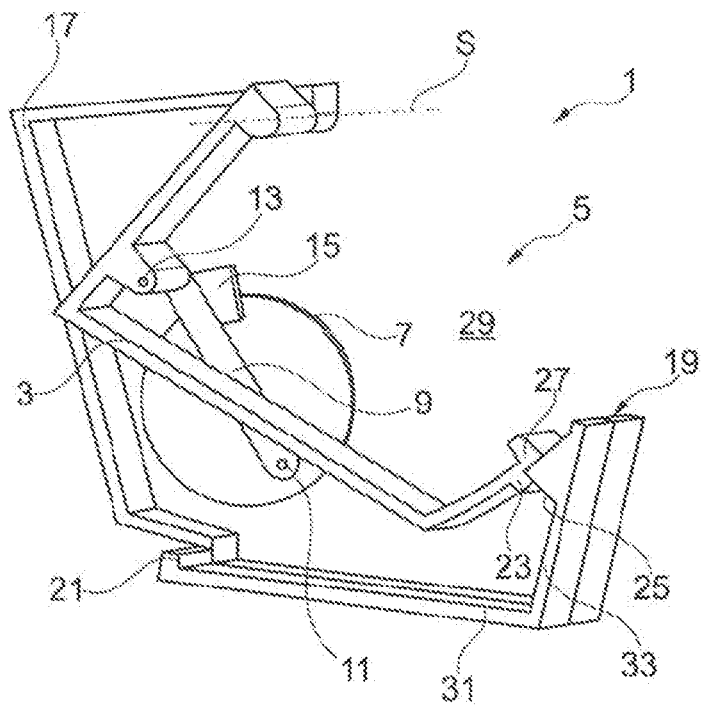
FIG. 4 shows the embodiment of the trim assembly according to FIGS. 1 to 3 in the second functional position.

The trim assembly 1 comprises a pivotably mounted first trim element 3 which is displaceable, in particular pivotable, into a first functional position that is shown in FIG. 1 and into a second functional position that is shown in FIG. 4. The trim element 3 is dimensionally stable, i.e., has at least enough inherent stiffness or inherent stability that, unlike in the case of a flexible sheet material, for example a textile or membrane web, it does not collapse in on itself but is instead constant in shape and pivotable about an axis. In order to bring about this displacement, an adjustment device 5 is provided. The adjustment device is designed to lock the first trim element 3 in at least one of the two functional positions, which functional position is also referred to as the blocking position. In this case, the first functional position is an extended protection position of the first trim element 3, in which the element is arranged and designed such that it can protect another body element, in particular a door, preferably during travel of the motor vehicle, from rock chips, dirt, and ultimately corrosion, the second functional position being a folded-in comfort position in which the first trim element 3 frees up installation space in order to increase the comfort of a user of the vehicle when getting into and out of the vehicle, in particular in order to provide additional legroom for these movement processes. In this case, the locking of the first trim element 3, by means of the adjustment device 5, in at least one of the two functional positions, preferably in both functional positions, is advantageous in that the functional positions can be precisely defined, it being possible in addition for forces in particular acting on the first trim element 3 from the outside not to be able to lead to undesired displacement from one functional position into the other functional position in each case.

In this case, the adjustment device 5, in particular in combination with the first trim element 3, is arranged in the first functional position, in an over dead center position. In this respect, it is clear that, in the embodiment shown here, the adjustment device 5 comprises an eccentric 7 that is driven by an actuator or a motor, is mounted so as to be rotatable about an axis of rotation D, and can preferably be caused to rotate about the axis of rotation D by means of an actuator or motor, in particular an electric motor, (not shown here). In this case, the actuator or motor is preferably coupled to the eccentric 7 by means of a self-locking transmission which preferably additionally contributes to the locking of the first trim element 3 in the at least one blocking position. A steering lever 9 is hinged to the eccentric 7 in an off-center manner, i.e., so as to be at a distance from the axis of rotation D and thus eccentric, which steering lever is in turn also hinged to the first trim element 3. In particular, a first end of the steering lever 9 is hinged to the eccentric 7 at a first articulation point 11, and an opposite, second end of the lever is hinged to the first trim element 3 at a second articulation point 13. If the eccentric 7 is pivoted about the axis of rotation, in the anticlockwise direction in FIGS. 1 to 4, the coupling of the eccentric 7 to the first trim element 3 by way of the steering lever 9 causes the trim element to also be pivoted out of the first functional position and into the second functional position. Vice versa, a rotation of the eccentric 7 in the clockwise direction then causes the first trim element 3 to be pivoted out of the second functional position and back into the first functional position.

A dashed line L is drawn in FIG. 1, which line connects the axis of rotation D, and thus the center point of the eccentric 7, to the second articulation point 13. In this case, it is clear that, when the trim element 3 is arranged in the first functional position, the first articulation point 11 is not arranged so as to be colinear with the second articulation point 13 and the center point of the eccentric 7, but is instead displaced out of a colinear position, which is also referred to as the dead center position, and slightly further towards the first functional position, i.e., beyond the dead center position in the clockwise direction. If the first trim element 3 is intended to be displaced out of the first functional position and into the second functional position, the eccentric 7 must be rotated anticlockwise, by the actuator or motor, such that the first articulation point 11 is displaced above the dead center position. For this purpose, the first trim element 3 must in turn be forced slightly beyond the position thereof in the first functional position, for which purpose in particular a force has to be applied. In order to displace the first trim element 3 out of the first functional position, it is therefore necessary to work against a force that counteracts this displacement. In the over dead center position of the first articulation point 11, the first trim element 3 is locked in the first functional position thereof. In the over dead center position of the first articulation point 11, forces which act on the first trim element 3 and attempt to force the element out of the first functional position and towards the second functional position thereof cause a torque acting in the clockwise direction, i.e., counter to the direction of rotation, to be applied to the articulation point, in FIG. 1, which torque is in fact necessary for displacement into the second functional position. The eccentric 7 cannot be displaced further in this direction, however, since a stop element 15 arranged on the eccentric 7 strikes the first trim element 3 such that further rotation of the eccentric 7 in the clockwise direction is not possible.

The fact that the stop element 15 strikes the first trim element 3 is furthermore advantageous in that the eccentric 7 applies a force to the first trim element 3, by means of the stop element 15, during the rotational movement of the trim element in the direction of the first functional position, and can thus additionally force the trim element into the first functional position.

The first trim element 3 is mounted so as to be pivotable about a pivot axis S that is arranged on an upper end of the first trim element and extends in the longitudinal direction of the trim assembly 1 and thus in parallel with the vehicle longitudinal axis. The pivot axis S is represented here by a dot-dashed line. The first trim element 3 may be mounted, in the region of the pivot axis S, by means of a pivot pin, a film hinge, or in another suitable manner.

The trim assembly 1 comprises a second trim element 17 which is stationary relative to the first trim element 3. The first trim element 3 is pivotably hinged to the second trim element 17, particularly preferably by means of a guide or pivot pin.

In this case, it is also clear that the first trim element 3 extends along the longitudinal extension, i.e., in particular in the direction of the pivot axis S, of the trim assembly 1 only in regions.

The trim assembly 1 furthermore comprises at least one third, in this case precisely one third, trim element 19 which is also stationary relative to the first trim element 3. A first stop 21 is arranged on the third trim element 19, which stop the first trim element 3 strikes, in this case by a first projection 23, in the first functional position. In addition, the third trim element 19 comprises a second stop 25, which stop the first trim element 3 strikes, in this case also by the first projection 23, in the second functional position. In the first functional position, the stop element 15 that is fastened to the eccentric 7 or formed integrally with the eccentric 7 preferably strikes a second projection 27 of the first trim element 3.

When mounted as intended on a body element to which the trim is to be applied, in particular a side member that is also generally denoted a rocker, side rocker or door rocker, the adjustment device 5 is arranged in a region of the trim assembly 1 which does not overlap the body element to which the trim is to be applied, i.e., preferably the side member. In particular, in a state when mounted on a motor vehicle body, the adjustment device 5 is preferably arranged in the region of a column, preferably in the region of an A column, where sufficient installation space is available for accommodating the adjustment device 5.

It is also clear from FIG. 1 that the first trim element 3, and in this case also the second trim element 17, each have a C-shaped cross-sectional contour. In this case, an open side of the C faces an interior 29 of the trim assembly 1. In the first functional position, the first trim element 3 is aligned with the second trim element 17 and in particular ends flush therewith. In particular, the two cross-sectional contours of the trim elements 3, 17 overlap one another in the first functional position.

The third trim element 19 is L-shaped, the element being arranged in this case as a lying L, such that a first, longer limb 31 of the L forms a lower face of the trim assembly 1, a second, shorter limb of the L extending upwards proceeding from the first limb 31 and constituting an end wall towards the interior or towards a central longitudinal axis of a vehicle body. The first stop 21 is arranged on the first limb 31. The second stop 25 is arranged on the second limb 33.

Figure 2:
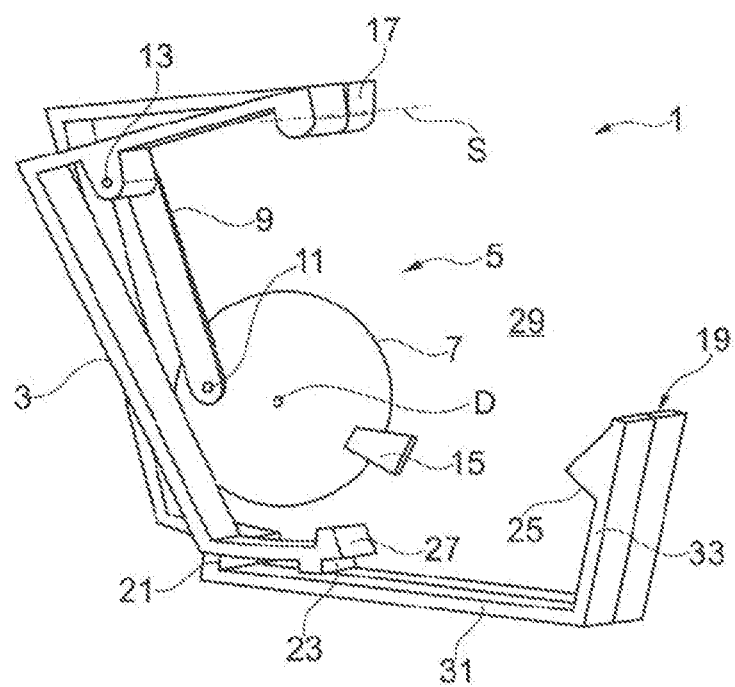
FIG. 2 shows the embodiment of the trim assembly according to FIG. 1 in a first intermediate position between the first functional position and a second functional position.

FIG. 2 shows the embodiment of the trim assembly 1 according to FIG. 1 in a first intermediate position between the first functional position and the second functional position. Identical and functionally identical elements are provided with the same reference signs, and therefore reference is made in this respect to the above description. In this case, it is clear that the pivot movement of the first trim element 3 out of the first functional position and into the second functional position is brought about by the adjustment device 5 in that the eccentric 7 is rotated anticlockwise, proceeding from the position shown in FIG. 1, the rotational movement of the eccentric 7 being converted by the steering lever 9 into the pivot movement of the first trim element 3 about the axis S. The stop element 15 is displaced away from the second projection 27, in accordance with the rotational movement of the eccentric 7, such that the projection can freely pivot out. It is also clear that, proceeding from the position shown in FIG. 1, the colinear dead center position of the first articulation point 11, the second articulation point 13 and the center point of the eccentric 7 has to be overcome in order to reach the intermediate position shown in FIG. 2.

Figure 3:
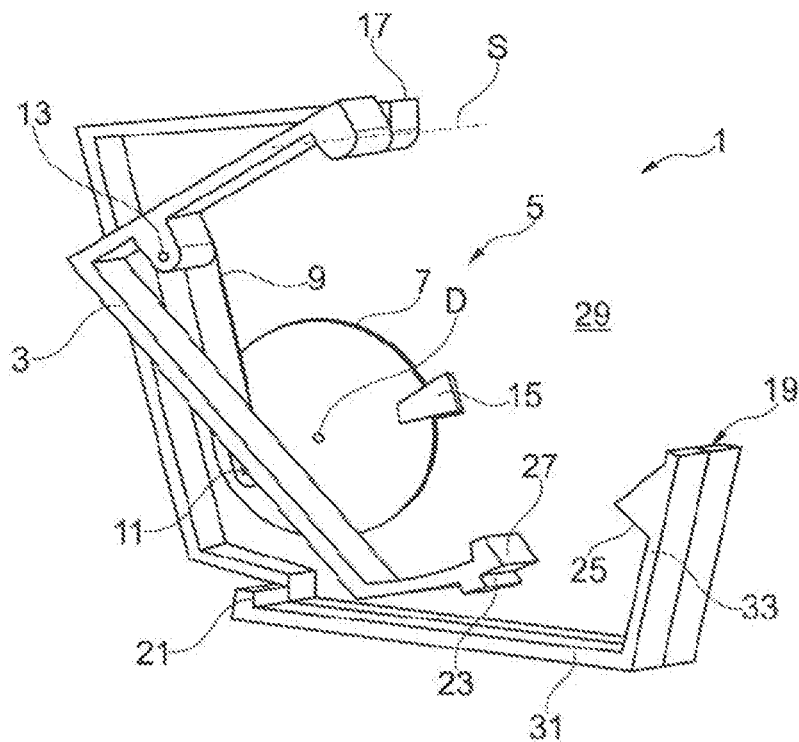
FIG. 3 shows the embodiment of the trim assembly according to FIGS. 1 and 2 in a second intermediate position between the first functional position and a second functional position.

FIG. 3 shows a second intermediate position between the first functional position and a second functional position of the embodiment of the trim assembly 1 according to FIGS. 1 and 2. Identical and functionally identical elements are provided with the same reference signs, and therefore reference is made in this respect to the above description. In this case, the eccentric 7 is here twisted even further in the anticlockwise direction, proceeding from FIG. 1, and accordingly the first trim element 3 is pivoted further out of the first functional position thereof, towards the second functional position thereof.

FIG. 4 is a view of the embodiment of the trim assembly 1 according to FIGS. 1 to 3 in the second functional position. Identical and functionally identical elements are provided with the same reference signs, and therefore reference is made in this respect to the above description. In this case it is clear that, in the second functional position, the steering lever 9 strikes the stop element 15, and therefore the adjustment device 5 both comprises the stop element 15 and also itself rests on the stop element 15, in this case by way of the steering lever 9, in the second functional position that is designed as the blocking position, the adjustment device also being forced against the stop element 15 by means of a force acting on the first trim element 3 in a direction counter to the blocking positions. Specifically, in this respect, an over dead center position of the articulation points 11, 13 is also achieved in the second functional position, although this is hard to identify here owing to the perspective selected. This results in locking for the second functional position, and, in addition, a force acting on the first trim element 3 and attempting to force the trim element in the direction of the first functional position brings about a torque in the first articulation point 11, which torque attempts to rotate the eccentric 7 further in the anticlockwise direction, which is, however, impossible since the steering lever 9 strikes the stop element 15 and blocks this further rotation.

At the same time, the first projection 23 of the first trim element 3 strikes the second stop 25, with the result that the second functional position is defined and supported in this respect too.

Figure 5:
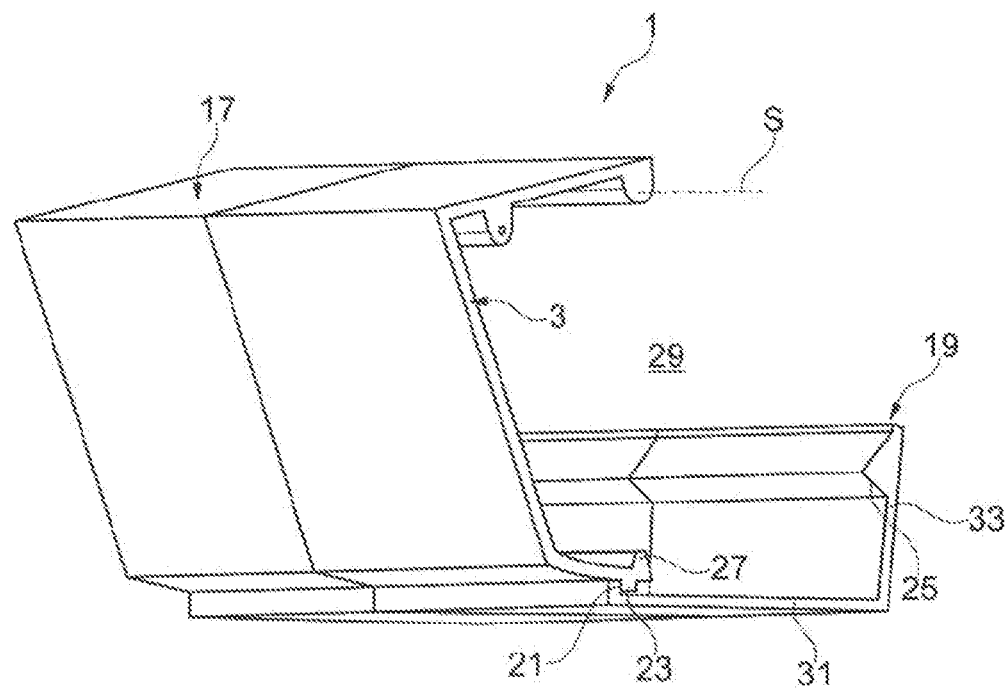
FIG. 5 is a further view of the embodiment of the trim assembly according to FIGS. 1 to 4 in the first functional position.

FIG. 5 is a further view of the embodiment of the trim assembly 1 according to FIGS. 1 to 4. Identical and functionally identical elements are provided with the same reference signs, and therefore reference is made in this respect to the above description. In this case, it can clearly be seen that the first trim element 3 and the second trim element 17 have the same cross-sectional contour and are arranged so as to be flush and aligned with one another in the first functional position.

Figure 6:
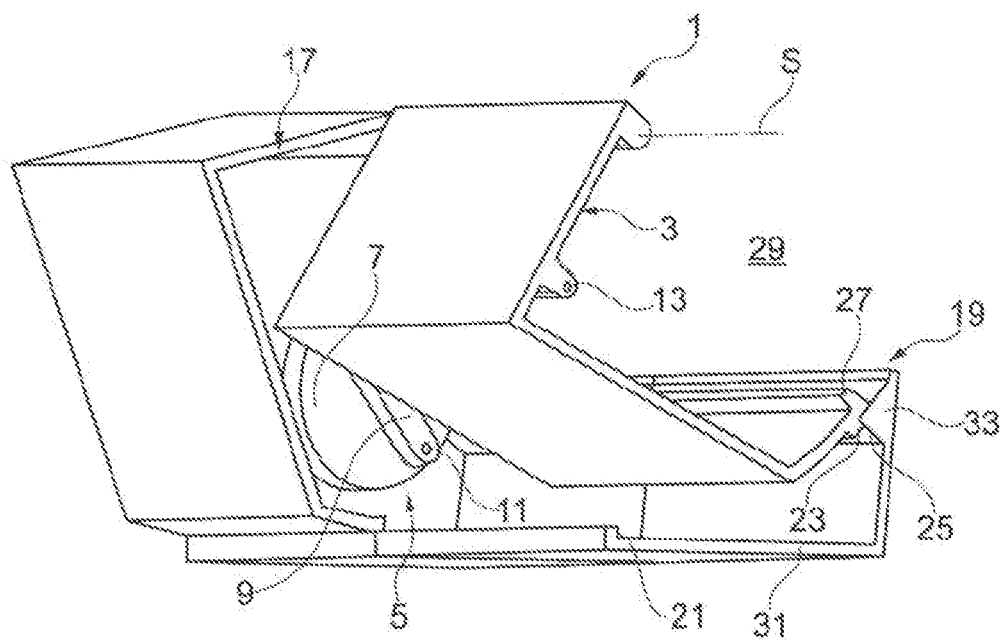
FIG. 6 is the view according to FIG. 5 having the trim assembly in the second functional position.

FIG. 6 is a further view of the embodiment of the trim assembly 1 according to FIGS. 1 to 5, which view is analogous to the view according to FIG. 5. Identical and functionally identical elements are provided with the same reference signs, and therefore reference is made in this respect to the above description. In this case, it is possible here to clearly identify the folded-in position of the first trim element 3 in the second functional position, and therefore it is also clearly visible that, in the second functional position, also referred to as the comfort position, the first trim element 3 frees up space which is available for example for legs of a user of a vehicle, in order to increase the comfort when getting into and out of the vehicle.

An important aspect of the trim assembly 1 proposed here is in particular the fact that the adjustment device 5 is preferably arranged in an over dead center position in each case, in both functional positions, specifically in the first functional position and in the second functional position, the adjustment device 5 and/or the first trim element 3 in addition resting on a defined stop in each case, such that the first trim element 3 is retained in a secure and stable manner in a defined position, and specifically preferably in both functional positions.

Overall, it is clear that the trim assembly 1 proposed herein provides a trim assembly which is improved with respect to the accuracy of the operating principle thereof and the reliability thereof.

The invention claimed is:

1. A trim assembly for a trim of a body element of a vehicle, comprising:
   a pivotably mounted first trim element that is displaceable into a first functional position and into a second functional position;
   an adjustment device for adjusting the first trim element from the first functional position into the second functional position and/or from the second functional position into the first functional position;
   wherein the adjustment device is configured to secure the first trim element in a blocking position in at least one of the first functional position and the second functional position, against displacement out of the blocking position; and
   a stop element which is fastened to the adjustment device or is formed integrally with the adjustment device and which is disposed such that, in the blocking position, the stop element strikes the first trim element.

2. The trim assembly according to claim 1, wherein the adjustment device, and/or the first trim element in combination with the adjustment device, is disposed in an over dead center position in the blocking position.

3. The trim assembly according to claim 1, wherein, in the blocking position, the trim assembly is forced against the stop element by a force acting on the first trim element in a direction counter to the blocking position.

4. The trim assembly according to claim 1, wherein the first trim element is pivotably mounted so as to be pivotable about a pivot axis that is disposed on an upper end of the first trim element and extends in a longitudinal direction of the trim assembly.

5. The trim assembly according to claim 1 further comprising a second trim element which is stationary relative to the first trim element, wherein the first trim element is pivotably hinged to the second trim element.

6. The trim assembly according to claim 1, wherein the first trim element extends along a longitudinal extension of the body element only in regions.

7. The trim assembly according to claim 5 further comprising a third trim element which is stationary relative to the first trim element, wherein a first stop for the first trim element in the first functional position is disposed on the third trim element and/or a second stop for the first trim element in the second functional position is disposed on the third trim element.

8. The trim assembly according to claim 1, wherein the adjustment device is disposed in a region of the trim assembly which, when mounted as intended on the body element, does not overlap the body element.

9. The trim assembly according to claim 7, wherein the first trim element and the second trim element have a C-shaped cross-sectional contour, wherein an open side of the C-shaped cross-sectional contour faces an interior of the trim assembly, wherein the third trim element is L-shaped, wherein the first stop for the first trim element is disposed on a first limb of the L-shape, and wherein the second stop for the first trim element is disposed on a second limb of the L-shape.

10. A motor vehicle, comprising:
    a side door opening which is defined at a bottom by a side rocker that comprises a support structure and the trim assembly according to claim 1.

* * * * *